United States Patent Office 3,595,870
Patented July 27, 1971

3,595,870
METAL COMPLEXES OF 2-BENZIMIDAZOLE-
CARBAMIC ACID ESTERS
Hein L. Klopping, Wilmington, Del., assignor to E. I. du
Pont de Nemours and Company, Wilmington, Del.
No Drawing. Filed Nov. 19, 1968, Ser. No. 777,171
Int. Cl. C07d 47/38
U.S. Cl. 260—299   4 Claims

ABSTRACT OF THE DISCLOSURE

Metal complexes prepared by reacting (1) organic compounds having the formula

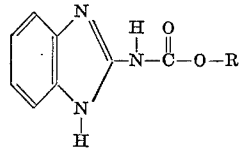

wherein R is lower alkyl, and (2) metal salts, such as zinc chloride or copper acetate, are useful as fungicides and/or mite ovicides.

BACKGROUND OF THE INVENTION

This invention relates to a group of complexes prepared by reacting (1) 2-benzimidazolecarbamic acid esters and (2) salts; to methods of making said complexes; and to methods of using said complexes to control fungi and mites.

The survival of man has been dependent upon his ability to protect plants and their products which satisfy his basic needs from various agents of destruction such as fungi and mites. With the rapidly increasing population of the world it becomes imperative that there be continuing improvements in the efficiency of the materials and the methods employed to provide this protection. These improvements can be in the form of effective control of more kinds of pests or in the form of requiring less material or work. The materials and methods of this invention represent marked advances in both of these possible areas of improvement, as will be explained more fully.

It has been discovered that application of the complexes of this invention by the methods of this invention entirely precludes or reduces damage to plants and inanimate organic materials due to both fungi and mites. Fungus mycelia are killed or prevented from developing further by the presence of one or more of the compounds, i.e., the compounds are fungicidal or fungistatic. The compounds further prevent mite populations from expanding or reduce them to a low level or even eliminate them by preventing the normal hatching of their eggs, i.e., the compounds are mite ovicides.

The compounds and methods of this invention also make possible the control of damage by both fungi and mites with an amazingly small amount of chemical and with surprisingly little effort.

SUMMARY OF THE INVENTION

It has been found that outstanding fungicidal and mite ovicidal activity can be obtained by applying to the locus of a fungus and/or mite infestation, an effective amount of a complex of (1) an organic compound having the formula:

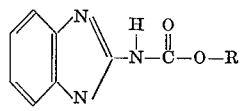

(I)

wherein R is methyl, ethyl, isopropyl, or sec-butyl, and (2) a salt selected from the group consisting of:

(A) zinc chloride (ZnCl₂)
(B) zinc bromide (ZnBr₂)
(C) zinc acetate [Zn(O—C(=O)—CH₃)₂]
(D) zinc propionate [Zn(C—C(=O)—CH₂CH₃)₂]
(E) copper(II) chloride (CuCl₂)
(F) copper(II) bromide (CuBr₂)
(G) copper(II) acetate [Cu(O—C(=O)—CH₃)₂]; and
(H) copper(II) propionate [Cu(O—C(=O)—CH₂CH₃)₂]

The most preferred complex is 2-benzimidazolecarbamic acid, methyl, ester, 2:1 complex with zinc chloride.

It should be understood that benzimidazolecarbamates exist in tautomeric forms, i.e.,

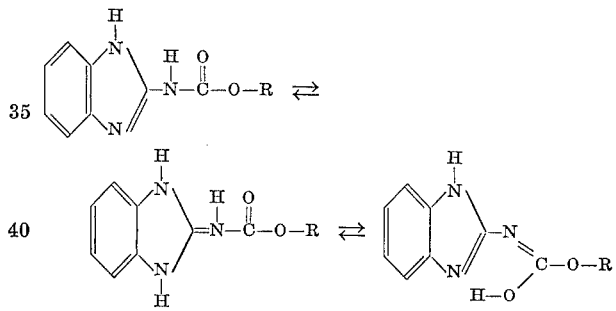

References herein to amounts of complex which control both fungi mites are "effective amounts." Quantities which control fungi or mites are referred to as "fungicidal amount" and "mite ovicidal amount," respectively.

DETAILED DESCRIPTION OF THE INVENTION

Several complexes can be formed according to the process of the invention. The complexes may be either 2:1 or 1:1 complexes. A 2:1 complex is a complex having two molecules of the 2-benzimidazole and 1 molecule of the salt whereas a 1:1 complex contains one molecule of the 2-benzimidazole and one molecule of the salt.

2:1 complexes

Complexes having two molecules of the 2-benzimidazolecarbamate and one molecule of salt can be prepared from any suitable 2-benzimidazolecarbamate and a salt selected from the group consisting of zinc chloride, zinc bromide, copper(II) chloride, and copper(II) bromide. The zinc 2:1 complexes of this invention have the chemical formula:

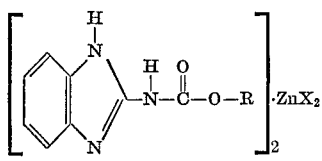

(II)

wherein:

R is methyl, ethyl, isopropyl or sec-butyl; and
X is chlorine or bromine.

The copper 2:1 complexes have the chemical formula:

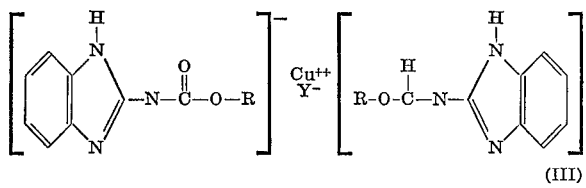

(III)

wherein:

R is methyl, ethyl, isopropyl, or sec-butyl; and
Y is chlorine or bromine.

While the exact chemical structure and bonding of these 2:1 complexes is not known with certainty, in the case of the zinc complexes it is believed that the salt is probably bonded to the 2-benzimidazolecarbamate by four coordinate bonds. Thus the zinc 2:1 complexes may have the general structural formula:

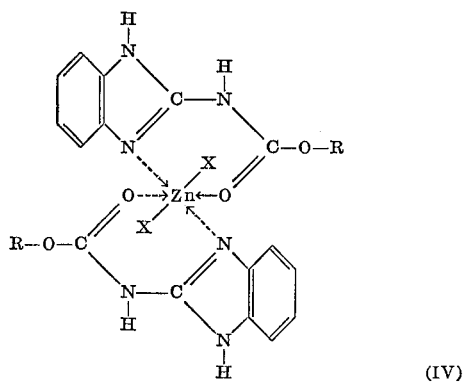

(IV)

wherein R and X are defined above.

Thus, a 2-benzimidazolecarbamic acid, methyl ester-2:1-complex with zinc chloride is believed to have the formula:

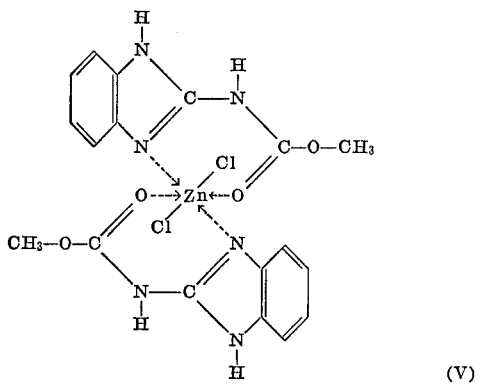

(V)

It should be noted that in the case of these zinc 2:1 complexes, the metal is present in the form of an electrically neutral salt. Likewise, while the exact chemical structure of the copper 2:1 complexes is not known, it is believed that they may be represented by the general structural formula:

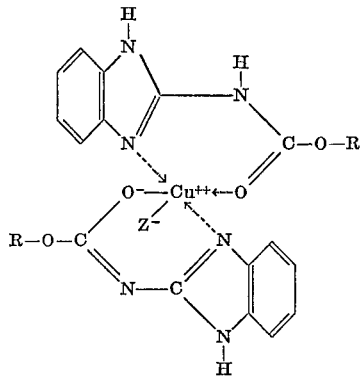

(VI)

wherein

R is methyl, ethyl, isopropyl, or sec-butyl; and
Z is chlorine or bromine.

It is theorized that three coordinate and one ionic bond unite the copper atom and the benzimidazolecarbamic acid group. A 2-benzimidazolecarbamic acid, methyl ester-2:1-complex with copper(II) monochloride would have the formula:

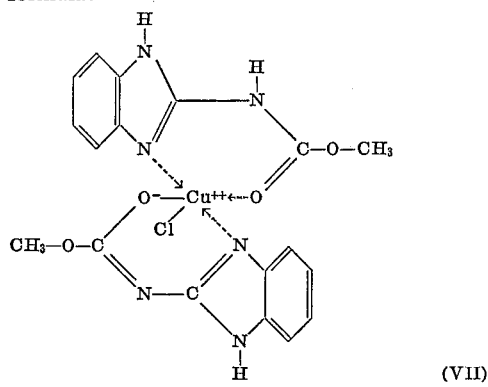

(VII)

1:1 complexes

Complexes having one molecule of 2-benzimidazole and one molecule of metal salt can be prepared from any suitable 2-benzimidazole and a salt selected from the group consisting of zinc acetate, zinc propionate, copper(II) chloride, copper(II) bromide, copper(II) acetate, and copper(II) propionate. The 1:1 complexes have the chemical formula:

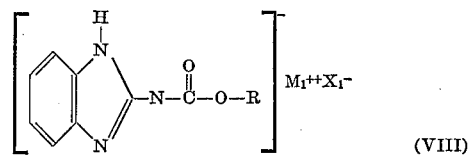

(VIII)

wherein:

R is methyl, ethyl, isopropyl or sec-butyl;
$M_1$ is zinc or copper; and
$X_1$ is acetate or propionate when $M_1$ is zinc and is chlorine, bromine, acetate, or propionate when $M_1$ is copper.

As in the case of 2:1 complexes, the exact structure of the 1:1 complexes is uncertain. The 1:1 complexes may have the structure

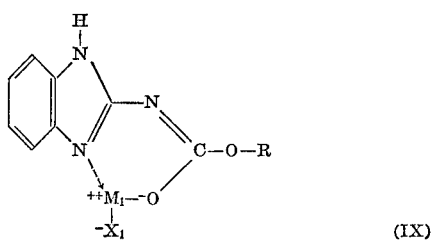

(IX)

wherein:

R is methyl, ethyl, isopropyl or sec-butyl;
$M_1$ is zinc or copper;
$M_1$ is zinc, $X_1$ is acetate or propionate and when $M_1$ is copper $X_1$ is chlorine, bromine, acetate, or propionate.

A 2-benzimidazolecarbamic acid methyl ester, 1:1 complex with copper(II) monoacetate, might be represented as:

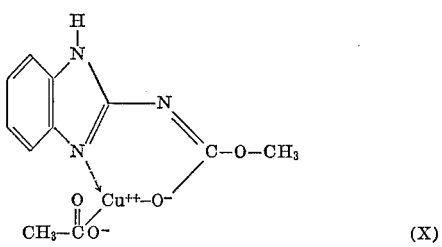

(X)

In this case, the salt is bonded to the 2-benzimidazolecarbamate by one ionic and one coordinate bond. Since only one acetate ion is present, the 1:1 complex is named 2-benzimidazolecarbamic acid, methyl ester, 1:1 complex with copper(II) monoacetate.

Preparation of complexes

The complexes of this invention are prepared by reacting a 2-benzimidazolecarbamic acid ester of Formula I with one of the eight salts listed above. The reaction may be performed such that a slurry of the 2-benzimidazolecarbamate is reacted with an aqueous solution of the salt.

In carrying out the reaction, the order of addition is not critical. In some cases, the 2-benzimidazolecarbamate is hard to wet with a concentrated solution of the salt. In these cases, it is advantageous to first thoroughly wet the 2-benzimidazolecarbamate with water before mixing same with the salt solution. Also, it is permissible, but not necessary, to use an organic solvent such as ethyl acetate to wet the benzimidazolecarbamate. The solvent may be left in the reaction mixture during the subsequent reaction.

The concentration of the 2-benzimidazolecarbamate in the aqueous slurry is not critical and can vary from very dilute to about 20% by weight. However, very dilute concentrations are not economical in light of the large amount of water which must be used and the large size of equipment required. Concentrations above about 20% are difficult to stir efficiently. The concentration of the metal salt is not critical, although it is preferred to use concentrated or saturated solutions, e.g., 66% by weight or higher in the case of zinc chloride. Since the salt solutions often contain large excesses of metal salt, it is economically advantageous to recover any filtrates for use in subsequent operations. While concentrated solutions are preferred, good results can be obtained by using dilute solutions of the salt. The total quantity of metal salt present in the reaction mixture can vary from the theoretical amount to an excess of well over 1000%.

The particle size of the 2-benzimidazolecarbamate suspended in the metal salt solution is not critical. Small particle sizes are advantageous in bringing about an increase in rate of reaction; however, at very small particle sizes the 2-benzimidazole may be hard to wet with the salt solution. Accordingly, inert wetting, dispersing, or emulsifying agents can in some cases be useful in improving the reaction conditions.

The time required to complete the reaction is not critical and can vary, for example, from a few seconds to 16 hours or more. Many factors influence reaction time, such as: temperature, concentration of reactants, particle size of the 2-benzimidazolecarbamate, etc. In each case the optimum conditions can be determined experimentally. Completeness of the reaction is best determined by the appearance and disappearance of certain peaks in the IR spectrum, as described in the examples.

The temperature at which the reaction proceeds is significant in some cases in regard to the product formed, whereas in other cases the temperature effects only the rate of reaction. For example, in reacting 2-benzimidazolecarbamic acid esters with copper(II) chloride at a temperature of about 100° C., a 1:1 complex with copper(II) monochloride is obtained, while at room temperature a 2:1 complex with copper(II) chloride is obtained as shown in Examples 3 and 4. In general, the reaction temperature can vary between around room temperature to about 130° C.

The presence of foreign ions, such as those which are produced during the production of the 2-benzimidazolecarbamic acid esters from alkyl chloroformates, cyanamide, and ortho-phenylene diamine, do not interefer with the coupling formation. Thus, it is not necessary to purify the starting 2-benzimidazolecarbamate prior to starting the reaction.

The complexes of this invention can be made either batchwise or on a continuous basis.

The following examples illustrate the preparation of the complexes of Formula I. The amounts are given in terms of parts by weight unless otherwise specified.

EXAMPLE 1

Preparation of 2-benzimidazolecarbamic acid, methyl ester, 2:1 complex with zinc chloride Five hundred seventy-three parts of 2-benzimidazolecarbamic acid, methyl ester is mixed with a solution of 273 parts of zinc chloride in 2500 parts of water. With vigorous stirring, the mixture is heated to reflux and kept at reflux temperature for 30 minutes. Then, the mixture is cooled and filtered, and the filter cake is washed thoroughly with water and dried, giving 696 parts of the product.

In the infrared spectrum the peaks at 5.84 and 7.90μ, which are characteristic for 2-benzimidazolecarbamic acid, methyl ester, are no longer present and new peaks at 5.75 and 8.07μ, which are characteristic for the zinc chloride complex, have appeared. This product may be used as such or in formulated form for antifungal application, even though it contains approximately 10% of starting material.

*Analysis.*—Calculated for a mixture of 90% by weight of 2:1 ester, zinc chloride complex ($C_{18}H_{18}N_6O_4ZnCl_2$) and 10% by weight of organic starting material (percent): C, 43.15; H, 3.6; N, 16.8; Cl, 12.3; Zn, 11.3. Product of Example 1 found (percent): C, 42.92; H, 3.61; N, 16.58; Cl, 12.63; Zn, 11.3.

The above product is purified as follows. 5.0 parts of the material is extracted with 200 parts of boiling acetonitrile and the hot mixture filtered. The insoluble material (0.5 part) exhibits an IR spectrum identical with that of 2-benzimidazolecarbamic acid, methyl ester. The acetonitrile filtrate is vacuum-concentrated to a small volume, cooled, and the precipitated solid (4 parts after air-drying) is collected on a filter. It consists of purely white, fluffy needles, and its IR spectrum is essentially the same as that of the crude product (characteristic peaks at 5.75 and 8.07μ). Evaporation of the mother liquor affords another 0.5 part of somewhat impure product.

The air-dried needles analyze for a product containing approximately 2% water, as shown by the following results:

*Analysis.*—Calculated for 2-benzimidazolecarbamic acid, methyl ester, 2:1 complex with zinc chloride ($C_{18}H_{18}N_6O_4ZnCl_2$) containing 2% water (percent): C, 40.9; H, 3.65; N, 15.91; Cl, 13.4; Zn, 12.35. Found (percent): C, 41.19; H, 3.40; N, 15.91; Cl, 13.12; Zn, 12.3.

The complex probably has the structure shown in Formula III above.

EXAMPLE 2

Preparation of 2-benzimidazolecarbamic acid, methyl ester, 1:1 complex with zinc monoacetate Fifty-seven parts of 2-benzimidazolecarbamic acid, methyl ester is mixed with a solution of 367 parts of anhydrous zinc acetate in 600 parts of water. With vigorous stirring, the slurry is heated to reflux and kept at reflux temperature for 2½ hours. The mixture is then cooled, filtered, the solid washed thoroughly with water, and air-dried. The product consists of 70 parts of a white powder. The IR spectrum showed characteristic peaks at approximately 5.7 and 8.1$\mu$. Peaks at 5.84 and 7.90$\mu$, which are characteristic for the organic starting material, were absent.

*Analysis.*—Calculated for 2 - benzimidazolecarbamic acid, methyl ester, 1:1 complex with zinc monoacetate ($C_{11}H_{11}N_3O_4Zn$) containing 1.5% $H_2O$ (percent): C, 41.4; H, 3.6; N, 13.55; Zn, 20.5. Found (percent): C, 41.34; H, 3.94; N, 13.56; Zn, 19.26.

This complex probably has the following structure:

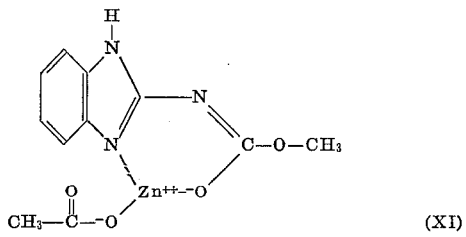

(XI)

EXAMPLE 3

Preparation of 2-benzimidazolecarbamic acid, methyl ester, 1:1 complex with copper(II) monochloride To a solution of 340 parts of copper(II) chloride dihydrate in 250 parts of water is added 57 parts of finely ground 2-benzimidazolecarbamic acid, methyl ester. The mixture is stirred and heated on a steambath for 4 hours. The very dark reaction mixture is cooled and diluted with water, whereby the color changes to green. The mixture is filtered, and the solid is washed thoroughly with water and air-dried to 57 parts of the product, a green powder.

*Analysis.*—Calcd. for $C_9H_9N_3O_2CuCl$: C, 37.3; H, 3.1; N, 14.5. Found: C, 37.09; H, 3.68; N, 14.53.

The infrared spectrum shows characteristic peaks at 5.75 and 8.04$\mu$.

This complex probably has the formula:

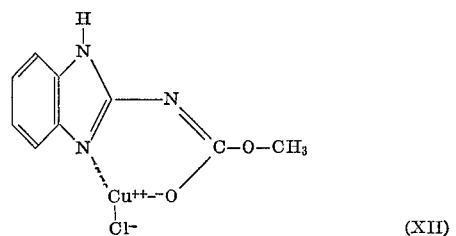

(XII)

EXAMPLE 4

Preparation of 2-benzimidazolecarbamic acid, methyl ester, 1:1 complex with copper(II) monochloride To a solution of 340 parts copper(II) chloride dihydrate in 400 parts of water is added 57 parts of finely divided 2-benzimidazolecarbamic acid, methyl ester. The mixture is stirred at room temperature for 16 hours. It is then filtered, the solid washed with water (whereby the color turns from green to brown), then with acetone, and air-dried. The infrared spectrum shows a peak at 5.84$\mu$ which is much stronger than that of the starting material, and a characteristic peak at 8.05$\mu$.

*Analysis.*—Calc. for 2-benzimidazolecarbamic acid, methyl ester 2:1 complex with copper(II) monochloride ($C_{18}H_{18}N_6O_4CuCl$) containing 1½% $H_2O$ (percent): C, 44.3; H, 3.9; N, 17.2. Found (percent): C, 4.29; H, 3.98; N, 17.37.

EXAMPLE 5

Preparation of 2-benzimidazolecarbamic acid, isopropyl ester, 2:1 complex with zinc chloride Thirty-one parts of 2-benzimidazolecarbamic acid, isopropyl ester is stirred with 200 parts of water until the solid is thoroughly wetted and suspended in the water. Then, a solution of 191 parts of zinc chloride in 380 parts of water is added, and the mixture is heated to reflux combined with stirring. After boiling under reflux for two hours, the mixture is cooled and filtered and the solid is washed with water and dried, giving 37 parts of the product as a white solid. The IR spectrum shows characteristic peaks at 5.75 and 8.05$\mu$ and very weak peaks at 5.9 and 7.9$\mu$, indicating the presence of some organic starting material.

In contrast with Example 1, the product in this case is insoluble in acrylonitrile (and acetone) whereas the starting material (the isopropyl ester) is soluble in acetonitrile and particularly in acetone. Therefore, in order to remove the organic starting material, the crude product is stirred in 300 parts of acetone, filtered, washed with 300 parts of acetone, and dried. The infrared spectrum no longer shows the weak peaks at 5.9 and 7.9$\mu$ but the strong peaks at 5.75 and 8.05$\mu$ are still present.

EXAMPLE 6

Preparation of 2-benzimidazolecarbamic acid, methyl ester 2:1 complex with zinc chloride, starting from a crude aqueous slurry of 2-benzimidazolecarbamic acid, methyl ester Methyl chloroformate (79.5 parts) and 50% sodium hydroxide (131 parts) are added simultaneously with good agitation to a solution of cyanamide (34.6 parts) in 165 parts of water. The separate addition rates are controlled so that the pH remains between 6.5 and 7.5. The temperature is kept at 50° C. or below by external cooling.

To this reaction mass are added o-phenylenediamine (75.3 parts) and enough concentrated hydrochloric acid to give a pH of 4.0. The mixture is then heated and stirred for an hour at 95° C. while the pH is maintained at 4.0 by the intermittent addition of concentrated hydrochloric acid. The resulting slurry contains 123.0 parts of 2-benzimidazolecarbamic acid, methyl ester.

Zinc chloride (275 parts) is added to the hot slurry. The mixture is stirred at 95° C. for another 20 minutes, cooled to 50° C. and filtered. The product is washed with water and dried in a vacuum oven at 100° C. The infrared spectrum of this product is identical with that of Example 1.

EXAMPLES 7–17

Using the indicated starting materials and the method of the example indicated, several complexes of this invention are prepared.

| Example | Procedure of Example | Starting materials | Resulting complex |
|---|---|---|---|
| 7 | 1 | (a) 2-benzimidazolecarbamic acid, methyl ester<br>(b) Zinc bromide | 2-benzimidazolecarbamic acid, methyl ester, 2:1 complex with zinc bromide. |
| 8 | 2 | (a) 2-benzimidazolecarbamic acid, methyl ester<br>(b) Zinc propionate | 2-benzimidazolecarbamic acid, methyl ester, 1:1 complex with zinc monopropionate. |
| 9 | 1 | (a) 2-benzimidazolecarbamic acid, ethyl ester<br>(b) Zinc chloride | 2-benzimidzolecarbamic acid, ethyl ester, 2:1 complex with zinc chloride |
| 10 | 3 | (a) 2-benzimidazolecarbamic acid, ethyl ester<br>(b) Copper (II) chloride | 2-benzimidazolecarbamic acid, ethyl ester, 1:1 complex with copper (II) monochloride. |
| 11 | 4 | (a) 2-benzimidazolecarbamic acid, isopropyl ester<br>(b) Copper (II) chloride | 2-benzimidazolecarbamic acid, islpropyl ester, 2:1 complex with copper copper (II) monochloride. |
| 12 | 2 | (a) 2-benzimidazolecarbamic acid, isopropyl ester<br>(b) Copper (II) chloride | 2-benzimidazolecarbamic acid, isopropy ester, 1:1 complex with copper (II) monochloride. |
| 13 | 1 | (a) 2-benzimidazolecarbamic acid, sec-butyl ester<br>(b) Zinc chloride | 2-benzimidazolecarbamic acid, sec-butyl ester, 2:1 complex with zinc chloride. |
| 14 | 4 | (a) 2-benzimidazolecarbamic acid, methyl ester<br>(b) Copper (II) bromide | 2-benzimidazolecarbamic acid methyl ester, 2:1 complex with copper (II) bromide. |
| 15 | 2 | (a) 2-benzimidazolecarbamic acid, methyl ester<br>(b) Copper (II) propionate | 2-benzmidazolecarbamic acid, methyl ester, 1:1 complex with copper (II) monopropionate. |
| 16 | 3 | (a) 2-benzimidazolecarbamic acid, methyl ester<br>(b) Copper (II) bromide | 2-benzimidazolecarbamic acid, methyl ester, 1:1 complex with copper (II) monobromide. |
| 17 | 2 | (a) 2-benzimidazolecarbamic acid, methyl ester<br>(b) Copper (II) acetate | 2-benzimidazolecarbamic acid, methyl ester, 1:1 complex with copper (II) monoacetate. |

UTILITY OF THE COMPLEXES

The present complexes are useful for controlling the effects of fungi and mites.

There are many fungi against which the complexes are active. These may be represented by, but are not limited to, the following: *Venturia inaequalis*, which causes apple scab; *Podosphaera leucotricha*, which causes powdery mildew on apple, *Uromyces phaseoli*, which causes bean rust; *Cercospora apii*, which causes early blight of celery; *Septoria apii-graveolentis*, which causes late blight of celery; *Sclerotinia sclerotiorum* which causes white mold on beans and other crops; *Cercospora beticola*, which causes Sigatoka disease of banana; *Monilinia fructicola* and *M. laxa*, which cause brown rot of stone fruits; *Erysiphe cichoracearum*, which causes powdery mildew on cantaloupe and other cucurbit crops; *Penicillium digitatum*, which causes green mold on citrus; *Sphaerotheca humuli*, which causes powdery mildew on roses; *Diplocarpon rosae*, which causes black spot on roses; *Unicinula necator*, which causes powdery mildew on grapes; *Coccomyces hiemalis*, which causes cherry leaf spot; *Cladosporium carpophilum*, which causes peach scab; *Pithomyces chartorum*, which grows on turf and pasture grasses and indirectly causes a malady in sheep; *Erysiphe graminis hordei*, which causes powdery mildew on barley; *Piricularia oryzae*, which causes rice blast; *Puccinia rubigo-vera tritici*, *P. coronata* and *P. glumarum*, which cause leaf rusts of wheat, oats and grasses respectively; *Puccinia graminis tritici*, which causes stem rust of wheat; *Aspergillus niger*, which causes cotton boll rot as well as decay following wounding in many plant tissues; *Aspergillus terreus*, which is common in soil and attacks vegetable matter; various species of *Rhizoctonia*, *Fusarium* and *Verticillium* present in soil and attacking the roots or other underground parts of a variety of plants; various species of *Penicillium* growing on such things as fabric, fiber board, leather goods and paint; species of *Myrothecium* attacking such items as shower curtains, carpets, mats and clothing.

The mite ovicidal action of the complexes of this invention is useful in preventing the development of damaging populations of mites or in causing the gradual reduction of existing populations. The movement of mites is limited and their life span is relatively short. Thus, an increase in population or even the continuation of a high population in a particular locus depends largely upon the hatching of eggs laid in that locus.

Mite eggs do not hatch to produce living young if these eggs are treated with one of these complexes, or if they are laid on a surface containing one of these complexes. Further, the eggs will not hatch if they are laid by a female mite that has been in contact with one of these complexes, or are laid by a female mite that is ingesting or has recently ingested food such as plant juices containing one of these complexes. This interference with the hatching of eggs prevents the population from increasing significantly beyond that present at the time of treatment. Also, this ovicidal action, along with the high natural mortality of adults, can largely eliminate mites from an already infested area over a relatively short period of time.

Many species of mites which cause damage or discomfort to animals, fruits, field crops, vegetables, and ornamentals under a wide variety of circumstances, are controlled by the complexes. The extent of the practical utility of the mite control obtained is represented by, but is not limited to, the following specific susceptible mites: *Panonychus ulmi* (European red mite) and *Tetranychus telarius* (two-spotted mite) which are commonly called "orchard mites"; these mites attack a great many deciduous tree fruits including apples, pears, cherries, plums and peaches; *Tetranychus atlanticus* (Atlantic or strawberry mite), *T. cinnabarinus* (carmine spider mite) and *T. pacificus* (Pacific mite); these mites attack cotton and numerous other crop plants; *Paratetranychus citri* (citrus red mite) and others which attack citrus; *Bryobia praetiosa* (clover mite) which attacks clover, alfalfa and other crops and can become a pest in buildings; *Dermanyssus gallinae* which attacks and can even kill domestic birds including chickens and pigeons; *Allodermanyssus sanguineus* which lives on rodents but can attack other animals; *Aceria neocynodomis* which attacks grasses and other plants; *Tyrophagus lintneri* which is a serious pest in stored foods and on cultivated mushrooms and *Lepidoglyphus destructor* which injures Kentucky bluegrass seed in storage.

The complexes of this invention when applied by the methods of this invention enter and move freely within plants, i.e., they are systemic. Thus, both fungi and mites can be controlled in plant parts well removed from the point of application. In view of such movement, the complexes can be applied beneficially to certain seeds. For example, the treatment of cucumber seeds with a few grams per 50 kilograms of seed of a compound of this invention provides control of powdery mildew (*Erysiphe cichoracearum*) and mites on the resulting plants for periods in excess of 40 days. Applications to soil also provide control of certain foliage diseases and mites on plants growing in the treated soil. Spray or dust treatments of plant foliage impart protection against both fungi and mites to other foliage on the plant not actually sprayed and to new foliage developing later.

There are important practical advantages associated with the use of an effective systemic pesticide. Successful application to seed as described above, results in great savings in chemical and application costs. Soil applications which effectively protect entire plants for an extended period also represent similar savings. Distribution within the plant following foliage treatment eliminates the need for frequent retreatment to protect rapidly growing tissue. Also, materials within the plant are not subject to removal by rainfall. Similarly, movement or translocation of the chemical within the plant can provide protection to those parts of the plant that may not have been covered by the original spray application. This is of particular importance with plants of dense growth character resisting the intrusion of the spray and also to tall plants, such as shade trees, where the spray will not reach to the top.

An additional valuable characteristic of the complexes of this invention is their ability to prevent the spread or to kill fungus infection already established within a plant, i.e., they are curative. Thus, the complexes need not be applied until after conditions develop which permit the actual initiation of fungus attack. This means that, under some circumstances, it is possible to avoid applying any chemical during the entire life of the crop. In other cases, only a part of the normal full schedule of pesticide application is required.

Therefore, great savings both in chemical cost and application labor are possible with compounds capable of systemic and curative performance. Another saving is afforded by the complexes of this invention through the fact that both fungi and mites are controlled by applications of a single chemical.

The complexes of this invention provide protection from damage caused by fungi, mites or both when applied to the proper locus by the methods described hereinafter and at a sufficient rate to exert the desired fungicidal and mite ovicidal effect. They are especially suited for the protection of living plants such as fruit-bearing trees, nut-bearing trees, ornamental trees, forest trees, vegetable crops, horticultural crops (including ornamentals, small fruits and berries), fiber crops, grain and seed crops, sugarcane, sugar beets, pineapple, forage and hay crops, beans, peas, soybeans, peanuts, potatoes, sweet potatoes, tobacco, hops, turf and pasture.

Living plants may be protected from fungi and mites by applying one or more of the complexes of this invention to the soil in which they are growing or in which they may subsequently be seeded or planted; or to seeds, tubers, bulbs or other plant reproductive parts prior to planting; as well as to foilage, stems and fruit of the living plant. Living plants can also be protected by dipping the root system or physically injecting the chemical or chemicals into roots or stems.

Soil applications are made with dusts, granules, pellets, slurries or solutions. Preferred rates for application of the compounds of this invention to soil in which plants are or will be growing range from 1 to 200 parts per million by weight of the soil in which the roots are or will be growing. More preferred use rates are in the range of 2 to 50 parts per million.

Preferred rates for application to seeds, tubers, bulbs or other plant reproductive parts, range from 50 to 2000 grams of active compound of this invention per 50 kilograms of planting material treated. More preferred rates are in the range of 100 to 1000 grams of active compound per 50 kilograms. Applications are made from dusts, slurries or solutions. Such treatments protect the treated parts themselves from damage due to fungi, mites, or both, and in addition, impart extended protection against both types of pests to the resulting new plants.

Preferred rates for application of the compounds of this invention to foliage, stems and fruit of living plants range from 20 to 4000 grams of active ingredient per hectare. More preferred rates are in the range of 40 to 2000 grams per hectare. The optimum amount within this range depends upon a number of variables which are well-known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days.

Preferred rates for dip applications to roots of living plants are in the range of 20 to 1000 grams of active ingredient per 100 liters of water or other liquid carrier. More preferred rates are in the range of 40 to 500 grams per 100 liters.

Preferred rates for injection into the roots or stems of living plants are in the range of 1 to 1000 parts per million of water or other liquid carrier.

Plant parts such as fruits, tubers, bulbs, roots, and the like, harvested for food or feed, are protected from decay and other deterioration caused by fungi or mites during processing, distribution and storage by treatment with an active complex of this invention. The plant parts to be so protected can be dipped in a liquid bath containing the active ingredient, dusted with a finely divided preparation of the active ingredient, sprayed, misted with an aerosol containing the complex or enclosed in wrapping or packing materials impregnated with the active complex.

If a liquid bath is used, it can contain an amount of the active ingredient in the range of 1 to 5000 parts per million of the weight of the liquid.

Dusts as well as wrapping or packing materials used for this type of application can contain 0.1 to 10% of the active ingredient.

Wood, leather, fabric, fiber board, paper and other industrial materials of an organic nature can be protected from decomposition or discoloration by fungi and infestation by mites by coating, incorporating and impregnating with an effective amount of one or more of the complexes of this invention. The coating can be accomplished by dipping, spraying, flooding, misting (as with an aerosol) or dusting the material to be protected with a suitable composition containing the active ingredient.

Where incorporation or impregnation procedures are to be employed, use rates may be expressed in terms of the amount of active ingredient introduced into the material to be protected. The preferred use rates for these types of applications are in the range of 0.001 to 0.1 percent by weight of active ingredient in the final product.

Surface treatment is by dips, washes, sprays, aerosols or dust applications. Sprays, dips and washes contain the active complexes of the invention at rates of 10 to 5000 parts per million. Fluids for aerosol application and dusts contain 0.1 to 20% by weight.

Painted surfaces can be protected from unsightly stain and mold growth by incorporating in the paint formulation, prior to application, 5 to 2,000 parts per million of an active complex of this invention. Such treatments with the complex of this invention also protect the paint while still in the can from deterioration by fungi.

Damage by mites to stored organic products such as grain, seed, bulbs, tubers, meat or animal hides as well as annoyance or injury to animals inhabiting or frequenting structures is kept to a minimum by treating the floors, walls, partitions, and other parts of warehouses or other structures with one or more of the active complexes. Applications are made by the use of dusts, sprays, or aerosols with preferred use rates in the range of 1 to 1000 grams of the active compound of this invention per 100 square meters of surface to be kept free of excessive mite populations.

As was previously set forth, the complexes of this invention are especially suited for use on living plants. Application of the foliage, stems and fruit of plants at the rate indicated above is generally accomplished by employing sprays, dusts or aerosols containing the proper amount of active ingredient. For the control of mites and fungi which are regularly present, applications often start prior to the time that the problem actually appears and continue on a pre-determined schedule. Such a procedure is termed "preventive" or "protective."

With the complexes of this invention, successful control of plant diseases can also be accomplished by applications made after they are present. Fungus mycelia within the plant tissue are actually killed. This approach or effect is termed "curative" or "eradicant" and permits the user to realize considerable savings.

Curative control of plant diseases with the complexes of this invention is enhanced if the treated plant parts are moist for one or more periods of 2 to 12 hours each soon after the active compound is applied. Often the slow drying of an original spray treatment or naturally occurring rains, mists, fogs or dews will accomplish this. Under other circumstances, such as during dry periods or in shelters such as greenhouses, it is necesary to keep the plant moist by some special effort for best results.

Mite control and curative disease control with the complexes of this invention are improved by including a proper quantity of a selected surface active agent in the spray or dust applied to the plant. The most preferred surface active agents for this purpose include: modified phthalic glycerol alkyd resins, glycol esters, ethoxylated fatty acids, alcohol sulfates, lecithin and lecithin derivatives, isethionates, certain phosphate derivatives and taurates. Somewhat less preferred but, nevertheless, effective surface active agents include: sulfosuccinate derivatives, ethoxylated fatty esters and oils, ethoxylated alcohols, and dodecyl and tridecyl benzene sulfonates and free acids. Examples of specific surface active agents in each of these several categories are listed in "Detergents and Emulsifiers—1967 Annual" published by John W. McCutcheon, Inc.

The preferred rates for these surfactants when used in sprays is in the range from 10 to 1000 parts per million of the spray fluid.

For dusts, the preferred surfactants rates are in the range of 1000 to 100,000 parts per million of the material actually applied.

As previously mentioned, the complexes of the invention are systemic, thus applications to plants can be accomplished by spraying or dusting above-ground parts, such as foliage, stems and fruits. For such applications, the presence of a surface-active agent in the spray or dust enhances activity. Use rates for the surface active agent here are the same as for sprays and dusts for preventive or curative control as discussed above. Systemic effect from the treatment of above-ground parts is also enhanced by moisture on the treated surfaces for one or more periods of 2 to 12 hours each.

Systemic control of both mites and fungi on plants is also accomplished by applications to seeds, tubers, bulbs, or other reproductive parts prior to planting as well as by application of the chemical to the soil in which the plants to be protected are, or will be, growing. Applications to reproductive parts prior to planting is effected through the use of sprays, dips, dusts or aerosols containing one or more of the compounds of this invention. Treatment of soil is accomplished by physical mixing prior to planting, distribution in the furrow at planting time, application in transplant water, placement in the soil in a band or sheet with specialized equipment, injection through irrigation water or by distribution on the field surface.

COMPOSITIONS

Compositions can be formed by mixing a complex of this invention with an adjuvant. The complexes of this invention can often be used to advantage in combinations or mixtures with one or more of the fungicides, bactericides, insecticides, acaricides, or nematocides available on the market today. The combinations or mixtures can be made by the applicator just prior to use (as in the tank of a sprayer) or included in a single composition by the manufacturer or a subsequent processor. Illustrative of the materials that may be included in such combinations or mixtures are the following:

1,2,3,4,10,10-hexachloro-1,4,4a,5,8,8a-hexahydro-1,4-endoexo-5,8-dimethanonaphthalene (aldrin);
1,2,3,4,5,6-hexachlorocyclohexane (lindane);
1,2,4,5,6,7,8,8-octachloro-2,3,3a,4,7,7a-hexahydro-4,7-methanoindene (chlordane);
1,1,1-trichloro-2,2-bis(p-chlorophenyl)ethane (DDT);
1,2,3,4,10,10-hexachloro-6,7-epoxy-1,4,4a,5,6,7,8,8a-octahydro-14-endoexo-5,8-dimethanonaphthalene (dieldrin);
1,2,3,4,10,10-hexachloro-6,7-epoxy-1,4,4a,5,6,7,8,8a-octahydro-1,4-endoendo-5,6-dimethanonaphthalene (endrin);
1,(or 3a),4,5,6,7,8,8-heptachloro-3a,4,7,7a-tetrahydro-4,7-methanoindene;
1,1,1-trichloro-2,2-bis(p-methoxyphenyl)ethane methoxychlor);
1,1-dichloro-2,2-bis(p-chlorophenyl)ethane (TDE);
chlorinated camphene having a chlorine content of 67–69% (toxaphene);
chlorinated terpenes having a chlorine content of ca. 66% (Strobane®);
2-nitro-1,1-bis(p-chlorophenyl)butane;
1-naphthyl N-methylcarbamate (carbaryl);
methylcarbamic acid, ester with 4-(dimethylamino)-3,5-dimethylphenol;
methylcarbamic acid, ester with 1,3-dithiolan-2-one oxime;
methyl N-methylthiolcarbamate;
methyl methylthiolcarbamate;
O,O-diethyl-O-[2-isopropyl-4-methylpyrimid-6-yl] thiophosphate (diazinon);
O,O-dimethyl-1-hydroxy-2,2,2-trichloroethyl phosphonate;
O,O-dimethyl-S-(1,2-dicarbethoxyethyl) dithiophosphate (malathion);
O,O-dimethyl-O-p-nitrophenyl thiophosphate (methyl parathion);
O,O-diethyl-O-p-nitrophenyl thiophosphate (parathion);
O,O-dimethyl-O-(3-chloro-4-nitrophenyl) thiophosphate;
di-2-cyclopentenyl-4-hydroxy-3-methyl-2-cyclopenten-1-one chrysanthemate;
O,O-dimethyl-O-(2,2-dichlorovinyl) phosphate (DDVF); mixture containing 53.3% "Bulan," 26.7% "Prolan" and 20.0% related compounds;
O,O-dimethyl-O-(2,4,5-trichlorophenyl) phosphorothioate;
O,O-dimethyl-S-(4-oxo-1,2,3-benzotriazine-3(4H)-yl-methyl) phosphorodithioate (Guthion®);
bis-(dimethylamino)phosphonous anhydride;
O,O-diethyl-O-(2-keto-4-methyl-7-α'-pyranyl) thiophosphate;
O,O-diethyl (S-ethyl mercaptomethyl) dithiophosphate (phorate);
calcium arsenate;
sodium aluminofluoride;
dibasic lead arsenate;
2'-chloroethyl-1-methyl-2-(p-tert-butylphenoxy) ethyl sulfite;
azobenzene;
ethyl 2-hydroxy-2,2-bis(4-chlorophenyl) acetate;
O,O-diethyl-O-(2-(ethylmercapto)ethyl) thiophosphate;
2,4-dinitro-6-sec-butyl phenol;
O-ethyl O-p-nitrophenylbenzenethiophosphonate (EPN);
4-chlorophenyl-4-chlorobenzene sulfonate;
p-chlorophenyl phenyl sulfone;
tetraethyl pyrophosphate;
1,1-bis-(p-chlorophenyl)ethanol;
1,1-bis-(chlorophenyl)-2,2,2-trichloroethanol;
p-chlorophenyl p-chlorobenzyl sulfide;
bis-(p-chlorophenoxy)methane;
3-(1-methyl-2-pyrrolidyl)pyridine;
mixed esters of pyrethrolone and cinerolone keto-alcohols and two chrysanthemum acids;
cube and derris, both whole root and powdered;
ryanodiene;
mixture of alkaloids known as veratrine;
dl-2-allyl-4-hydroxy-3-methyl-2-cyclopenten-1-one esterified with a mixture of cis and trans dl-chrysanthemum monocarboxylic acids;
butoxypolypropylene glycol;
p-dichlorobenzene;
2-butoxy-2'-thiocyanodiethyl ether;
naphthalene;
1,1-dichloro-2,2-bis(p-ethylphenyl)ethane;
p-dimethylaminobenzenediazo sodium sulfonate;
quinone oxyaminobenzooxohydrazone;
tetramethyl thiuram monosulfide;
tetramethyl thiuram disulfide (thiram);
metal salts of ethylene bisdithiocarbamic acid, e.g., manganese, zinc, iron and sodium salts;
pentachloronitrobenzene;
2,3-dihydro-5-carboxyanilido-6-methyl-1,4-oxathiin;
n-dodecylguanidine acetate (dodine);
N-trichloromethylthiotetrahydrophthalimide (captan);
phenylmercury acetate;
2,4-dichloro-6-(o-chloroanilino)-s-triazine (Dyrene®);
N-methylmercury p-toluenesulfonanilide;
chlorophenolmercury hydroxides;
nitrophenolmercury hydroxides;
ethylmercury acetate;
ethylmercury 2,3-dihydroxypropyl mercaptide;
methylmercury acetate;
methylmercury 2,3-dihydroxypropyl mercaptide Ceresan® L);
3,3'-ethylenebis(tetrahydro-4,6-dimethyl-2H-1,3,5-thiadiazine-2-thione) (Cylan®);
methylmercury dicyandiamide;
N-ethylmercury p-toluenesulfonanilide;
1,4-dichloro-2,5-dimethoxy benzene (chloroneb);
metal (e.g., iron, sodium and zinc), ammonium and amine salts of dialkyldithiocarbamic acids;
tetrachloronitroanisole;
hexachlorobenzene;
hexachlorophene;
methylmercury nitrile;
tetrachloroquinone;
N-trichloromethylthiophthalimide;
5-ethoxy-3-trichloromethyl-1,2,4-thiadiazole;
1,2-dibromo-3-chloropropene;
dichloropropane-dichloropropene mixture;
ethylene dibromide;
1-chloro-2-nitropropane;
chloropicrin;
sodium dimethyldithiocarbamate;
tetrachloroisophthalonitrile;
2-carboxyamino-1-benzimidazolecarboxylic acid, dimethyl ester;
streptomycin;
2-(2,4,5-trichlorophenoxy)propionic acid;
p-chlorophenoxyacetic acid;
1-naphthaleneacetamide;
N-1-naphthylacetamide;
S-methyl-N-[(methylcarbamoyl)-oxy]thiolacetimidate; and
S-methyl-N-[(carbamoyl)-oxy]thiolacetimidate.

The additional pesticides are employed in mixtures or combinations in amounts ranging from one-tenth to ten times that of the compound or compounds of this invention. The proper choice of amounts for the added pesticides is readily made by one skilled in the art of protecting plants from pest depredations.

The use of pesticides such as those listed above in combinations with a compound of this invention sometimes appears to greatly enhance the activity of the compound of the invention. In other words, an unexpected degree of activity is sometimes seen when another pesticide is used along with a compound of this invention.

Specific illustrations of useful combinations and mixtures, along with representative (but not restrictive) applications, follow:

(a) 2-benzimidazolecarbamic acid, methyl ester 2:1 complex with zinc chloride and carbaryl in ratios ranging from 1:5 to 1:1 for use on snap beans to control white mold (Sclerotinia sclerotiorum) along with insects such as the Mexican bean beetle and flea beetles. Where aphids are a factor, parathion or Diazinon® may also be added to the mixture at rates ranging from one-tenth to one-half the level of the carbaryl. The 2-benzimidazolecarbamic acid, methyl ester 2:1 complex with zinc chloride in the mixture can be replaced by other compounds of this invention.

(b) 2-benzimidazolecarbamic acid, isopropyl ester, 2:1 complex with zinc bromide and DDT in ratios ranging from 1:6 to 1:1 for use on apple trees to control diseases such as scab and powdery mildew, as well as a variety of insects including the codling moth, the fall webworm, and the apple red bug. The 2-benzimidazolecarbamic acid, isopropyl ester, 2:1 complex with zinc bromide may be replaced in the combination by other compounds of this invention. The DDT may be replaced by methoxychlor or Guthion®. TDE can be added at the same rate as the other insecticide where the red-banded leaf roller is a particular problem. Thiram can be added to the mixture at the same rate as the compound of this invention to improve control of certain of the late-season fruit spot diseases.

(c) 2-benzimidazolecarbamic acid, methyl ester, 1:1 complex with copper(II) monochloride and Kelthane® dicofol in ratios ranging from 1:5 to 1:1 for use on squash to control powdery mildew along with red spider mites. The 2-benzimidazolecarbamic acid, methyl ester, 1:1 complex with copper(II) monochloride may be replaced in this combination by any other compound of this invention. The Kelthane® dicofol in the mixture may be replaced by malathion.

(d) 2-benzimidazolecarbamic acid, ethyl ester, 1:1 complex with zinc monopropionate and maneb in ratios of 1:6 to 1:1 for use on tomatoes to control a disease complex involving late blight, early blight (Alternaria), anthracnose (Colletotrichum), and gray leaf spot (Stemphylium). Lannate® methomyl may be added to the mixture in insecticidal amounts to provide control of tomato fruitworm and hornworm. The 2-benzimidazolecarbamic acid, ethyl ester, 1:1 complex with zinc monopropionate may be replaced in the mixture by any other compound of the invention.

(e) 2-benzimidazolecarbamic acid, methyl ester, 1:1 complex with copper(II) monoacetate and EPN in ratios ranging from 1:6 to 1:1 for use on grape vines in the field to control powdery mildew, as well as mites and the grape berry moth. The 2 - benzimidazolecarbamic acid, methyl ester, 1:1 complex with copper(II) monoacetate may be replaced in such a combination by any other compound of this invention. Captan and folpet may be added to the combination at rates ranging from one-half to four times that of the compound of this invention to provide improved control of dead arm.

(f) 2 - benzimidazolecarbamic acid, sec-butyl ester, 1:1 complex with zinc monoacetate along with dodine and wettable sulfur in ratios ranging from 1:3:8 to 1:1:6 for the superlative control of scab, powdery mildew, mites, black rot, cedar apple rust, and frog-eye leaf spot. Other compounds of this invention may be substituted for 2 - benzimidazolecarbamic acid, sec-butyl ester, 1:1 complex with zinc monoacetate in such combinations.

(g) 2-benzimidazolecarbamic acid, sec-butyl ester, 2:1 complex with zinc chloride and toxaphene in ratios ranging from 1:3 to 3:1 for use on lima beans to control powdery mildew and anthracnose, as well as insects such as cutworms, lygus bugs, and caterpillars. Copper sulfate or streptomycin sulfate may be added to the combination at active levels where bacterial diseases are a factor. Other compounds of this invention may be substituted for 2-benzimidazolecarbamic acid, sec butyl ester, 2:1 complex with zinc chloride in such combinations.

Compositions of this invention can be formulated by mixing a complex of this invention with other adjuvants such as one or more surface active agents.

The surface active agents used in this invention can be wetting, dispersing or emulsifying agents. They may act as wetting agents for wettable powders and dusts or as dispersing agents for wettable powders and granules. Surfactants may also enhance the biological activity of the 2-benzimidazolecarbamic acid ester metal complexes of this invention. Such surface active agents can include such anionic, cationic and nonionic agents as have heretofore been generally employed in plant disease control compositions of similar type. Suitable surface active agents are set out, for example, in "Detergents and Emulsifiers Annual—1967" by John W. McCutcheon, Inc. Other surface active agents not listed by McCutcheon but still effective dispersants by virtue of protective colloid action include methyl cellulose, polyvinyl alcohol, hydroxyethylcellulose, and alkyl substituted polyvinyl pyrrolidones.

Suitable surface active agents for use in compositions of this invention include polyethylene glycol esters with fatty and rosin acids, polyethylene glycol esters with alkyl phenols or with long-chain aliphatic alcohols, polyethylene glycol ethers with sorbitan fatty acid esters, and polyoxyethylenethio ethers. Other suitable surfactants include alkali and alkaline earth salts of alkyl aryl sulfonic acids, alkali and alkaline earth fatty acohol sulfates, dialkyl esters of alkali metal sulfosuccinates, fatty acid esters of alkali and alkaline earth isethionates and taurates, alkali and alkaline earth salts of lignin sulfonic acids, methylated or hydroxyethylated cellulose, polyvinyl alcohols, alkyl substituted polyvinyl pyrrolidone, alkali and alkaline earth salts of polymerized alkylnaphthalene sulfonic acids, and long-chain quaternary ammonium compounds. Anionic and nonionic surface active agents are preferred.

Among preferred wetting agents are sodium alkyl naphthalene sulfonates, sodium dioctylsulfosuccinate, sodium dodecylbenzene sulfonate, ethylene oxide condensates with alkylated phenols such as octyl, nonyl and dodecyl phenol, sodium lauryl sulfate, and trimethylnonyl polyethylene glycols. Among preferred dispersing agents are sodium, calcium and magnesium lignin sulfonates, low-viscosity methyl cellulose, low-viscosity polyvinyl alcohol, alkylated polyvinyl pyrrolidone, polymerized alkyl naphthalene sulfonates, sodium N-oleyl or N-lauryl isethionates, sodium N-methyl-N-palmitoyl taurate and dodecylphenol polyethylene glycol esters.

Compositions of this invention will contain, in addition to surface active agents, solid diluents to produce wettable powders, dusts, or granules as desired.

(A) Wettable powders.—Wettable powders are compositions which usually contain inert solid diluents in addition to surfactants. These inert diluents may serve several purposes. They can act as grinding aids to prevent mill smear and screen blinding, they can aid rapid dispersion of the mix when placed in water, they can adsorb liquid or low melting solid active material to produce a free flowing solid product, they can prevent agglomeration into lumps upon prolonged hot storage and they can permit preparation of compositions with a controlled amount of active ingredient so that proper dosage is easily measured by the consumer.

Suitable diluents may be either inorganic or organic in origin. These include the natural clays, diatomaceous earth, synthetic mineral fillers derived from silica or silicates, insoluble salts produced by precipitation in fluffy form such as tricalcium phosphate or calcium carbonate, and powdered organic diluents such as shell flours, wood flours, corn cob flour or sucrose. Preferred fillers for the compositions of this invention include kaolin clays, attapulgite clay, nonswelling calcium magnesium montmorillonites, synthetic silicas, synthetic calcium and magnesium silicates, diatomaceous silica, cob flour, and sucrose.

Wettable powders will normally contain both a wetter and a dispersant. Most preferred for dry wettable powders are those anionic and nonionic surfactants which exist in solid form. Occasionally a liquid, nonionic surfactant, normally considered an emulsifying agent can be used to produce both wetting and dispersion.

Wetting and dispersing agents in wettable powders of this invention, when taken together, will comprise from about 0.5 weight percent to 5.0 weight percent of the total composition. The active component will be present at a concentration of from about 25% to 90% and diluent makes up the balance to 100%. Where needed a corrosion inhibitor or foaming inhibitor may be added at rates of 0.1% to 1.0 with a corresponding reduction in diluent.

When surfactants are used to enhance biological activity, they are most commonly added as a separate component to the spray tank and are normally present at concentrations of 50–1000 p.p.m. based upon the water in the tank.

(B) Dusts.—Dust compositions are those intended for application in dry form with suitable dusting equipment. Since wind drift is undesirable when applying dusts, the most suitable dust diluents are those which are dense and rapid settling. These include kaolinites, talcs, pyrophyllites, ground phosphate rock, Sericite, and ground tobacco stems. However, dusts are usually most easily prepared by diluting an existing high-strength wettable powder with a dense diluent so that the final dust will frequently contain a fraction of light, absorptive diluent as well as the more desirable dense filler.

A wetting agent is desirable in dust formulations so that adhesion to dew-covered foliage is enhanced. Dusts made from wettable powders will usually contain sufficient wetter, but dusts made directly from unformulated active can contain an added wetting agent. Dry solid anionic or nonionic wetters are preferred.

Dust formulations will normally contain from 5.0 weight percent to 25 weight percent of active material, from 0% to 1.0% wetting agent, from 3% to 20% light grinding aid diluent and the balance dense, rapid settling diluent. If made by diluting a prepared wettable powder it will also contain a small amount of dispersing agent which has no active role when the composition is used as a dry dust.

(C) Granules.— Soil treatments with fungicides can frequently be most readily applied with granules. Granular products with the complexes of this invention, can be made in a number of ways. The active materials can be dissolved in a volatile carrier and sprayed upon preformed granules. They may be mixed as powders with suitable diluents and binders, then moistened and granulated followed by drying. Powders may also be applied to preformed granules by tumbling together and applying a binder, for example a nonvolatile liquid such as oil, glycol or a liquid nonionic surfactant. Rates of granule disintegration and dispersion of active material in moist soil can be controlled by choice of added surfactants or selection of the binders used to form the granule.

Suitable preformed granules include those made from attapulgite clay, granular expanded vermiculite, ground corn cobs, ground nut shells or preformed kaolinite granules. When active fungicide is placed upon such carriers the concentration may range from 1% to 25%. However, it is difficult to prevent segregation of active and carrier in concentration ranges above about 10% on preformed granules. When higher concentrations of active are desired best results are obtained by premixing powdered active, diluents, binders and surfactants then granulating so that the active is distributed throughout the granule and not solely upon its surface.

Suitable diluents for the preparation of granules by granulation or extrusion include kaolin clays, nonswelling calcium, magnesium montmorillonites, and gypsum. Cohesion to a firm granule is usually obtained by moistening compacting and drying, with or without some binding agents. Kaolin clays form firm granules if bound together with gelatinous agents such as methylcellulose, natural clays or swelling bentonite. Calcium, magnesium bentonites require no binder and gypsum can be made to form firm granules with either the addition of plaster of paris or certain salts such as ammonium sulfate, potassium sulfate or urea which form double salts with gypsum.

The active content of formed granules can range from 1–90% although 75% active represents about the upper level if controlled disintegration of the granule in moist soil is desired. Control of disintegration rate is attained by controlled compaction, e.g., controlled extrusion pressure and by the addition of inert water soluble components such as sodium sulfate which can leach away.

Any of the forms of granules described are suitable for use with the compounds of this invention, the one of choice being dependent upon the intended use.

The following examples illustrate the use of the complexes of this invention. Amounts are in parts by weight unless otherwise noted.

EXAMPLE 18

|  | Percent |
| --- | --- |
| 2-benzimidazolecarbamic acid, methyl ester, 2:1 complex with zinc chloride | 70 |
| Alkylnaphthalene sulfonic acid, sodium salt | 1.5 |
| Oleyl ester of sodium isethionate | 2.0 |
| Diatomaceous silica | 26.5 |

The above components are blended and micropulverized, then remilled in a fluid energy mill until the active fungicide is substantially all below 5 microns.

The resulting wettable formulation is added to water at a rate to provide 300 parts per million by weight of the active component in the total slurry. This dilute preparation is then sprayed on randomly selected apple trees in a commercial orchard. The spray procedure is such as to result in the application of liquid at the rate of 3,000 liters per hectare. Thus, the active component is applied at the rate of 900 grams per hectare. Applications start at the time that the first spring foliage growth appears and continue at weekly or semimonthyl intervals until one month prior to the normal harvest date for apples. At the time of harvest, trees that had been treated in this manner have healthy foliage of good color and provide a good yield of high quality fruit. Similar and adjacent trees left unsprayed, on the other hand, have foliage showing disease caused by the fungi *Venturia inaequalis* (scab fungus) and *Podosphaera leucotricha* (powdery mildew fungus). The foliage on the unsprayed trees is also of poor color and clearly unthrifty due to the activity of high population of leaf-feeding mites including *Panonychus ulmi* (European red mite) and *Tetranchus telarius* (two-spotted mite). The unsprayed trees yield only a few small fruit with diseased spots caused by the fungus *Venturia inaequalis*. Thus, the 2-benzimidazolecarbamic acid, methyl ester, 2:1 complex with zinc chloride applied in the form and by the method described effectively prevents damage to crop plants caused by certain fungi and mites.

EXAMPLE 19

|  | Percent |
| --- | --- |
| 2-benzimidazolecarbamic acid, isopropylester, 2:1 complex with zinc bromide | 70 |
| Sodium salt of sulfonated lignin | 2 |
| Alkylnaphthalenesulfonic acid, sodium salt | 1 |
| Kaolin clay (ASP 100—Minerals and Chemicals Co.) | 27 |

Components are blended, micropulverized and air milled as in Example 18. The resulting wettable powder formulation is added to water at a rate to provide 1,000 parts per million by weight of active ingredient in the final solution. This solution is sprayed on alternate rows of grape vines in a vineyard at the rate of 800 liters per hectare. Such applications start with the earliest growth in the spring and continue at intervals of 12 to 14 days until harvest time. At harvest time the foliage on the treated vines is healthy and dark green in color and the yield of marketable fruit is high. The alternate unsprayed grape rows, to the contrary, have foliage heavily diseased with powdery mildew (caused by the fungus *Uncinula necator*) and damaged by large populations of mites (including, among others, *Tetranychus pacificus*). Thus, the compound of this invention applied in the proper form and by the method described effectively controls powdery mildew and certain mites.

EXAMPLE 20

|  | Percent |
| --- | --- |
| 2-benzimidazolecarbamic acid, methyl ester, 1:1 complex with copper-(II) monochloride | 50 |
| Dioctyl sodium sulfosuccinate | 3 |
| Sodium N-methyl-N-palmitoyltaurate (44%) | 4 |
| Sucrose | 43 |

Components are blended and micropulverized, then double air milled for minimum particle size.

This wettable powder is added to water in an amount to provide 300 parts per million of the active component in the final spray suspension. This liquid preparation is then used to spray randomly selected orange trees in an otherwise untreated grove in California. The application volume is at the rate of 6,000 liters per hectare. The first application is made just after bloom and it is repeated at monthly intervals until harvest time. Trees treated in this fashion remain thrifty and of a good, dark green color. Fruit from the treated trees retains its quality during transportation and storage. Adjacent untreated trees show damage on both fruit and foliage caused by the citrus and red mite (*Paratetranychus citri*). Much of the fruit from the untreated trees is damaged during storage and transit by green mold caused by *Penicillium digitatum*. Therefore, the compound of this invention applied in the form and by the method described effectively prevents damage by both mites and fungi.

EXAMPLE 21

|  | Percent |
| --- | --- |
| 2-benzimidazolecarbamic acid, ethyl ester, 1:1 complex with zinc monopropionate | 70 |
| Dodecyl phenol polyethylene oxide condensate | 4 |
| Synthetic fine silica | 26 |

The liquid surfactant is first blended with the active component, followed by the diluent. The mix is then micropulverized and air milled until substantially all of the particles of active ingredient have a particle size less than 3 microns.

The wettable powder thus prepared is added to water in an amount to provide 1,000 parts per million of the active ingredient in the total preparation. This is used to spray alternate rows in a cherry orchard in Wisconsin. Applications at the rate of 1,000 liters per hectare are made starting with the earliest green tissue in the spring and continuing at intervals of two weeks until just prior to harvest. The rows of trees thus treated remain healthy and vigorous throughout the growing season and produce good quality fruit that keeps well during storage. The trees in the untreated rows show damage to blossoms and fruit caused by the brown rot fungi (*Monilinia fructicola* and *M. laxa*). Also, the foliage of the untreated trees is damaged by the cherry leaf spot organism (*Coccomyces hiemalis*). The complex of this invention, applied in the proper composition and by the method described protects cherry trees from attack by fungi.

EXAMPLE 22

|  | Percent |
| --- | --- |
| 2-benzimidazolecarbamic acid, methyl ester, 1:1 complex with copper(II) monoacetate | 10 |
| Alkyl naphthalene sulfonic acid, sodium salt | 0.5 |
| Attapulgite | 10.0 |
| Micaceous talc | 79.5 |

The active, attapulgite and surfactant are first blended, micropulverized and air milled. This fine particled product is then blended with the micaceous talc to form a dust.

The active, sugar and surfactant are first blended, micropulverized and air milled. This fine particled product is then blended with the micaceous talc to form a dust.

The above dust is applied with a hand duster to designated plots with a large cucumber field. Each application is at the rate of 10 kilograms of the formulation per hectare. The application made on the plants start to form runners and are known to be already infected with the powdery mildew fungus (*Erysiphe cichoraciarum*). At harvest the plants within the treated plots are healthy and yield well. The untreated area outside the plots, on the other hand, contain only cucumber plants heavily diseased with powdery mildew. The compound of this invention formulated and applied as described provides curative or eradicant control of cucurbit powdery mildew.

EXAMPLE 23

| | Percent |
|---|---|
| 2 - benzimidazolecarbamic acid, sec-butyl ester, 1:1 complex with zinc, monoacetate | 5 |
| Sodium lauryl sulfate | 0.5 |
| Kaolin clay | 10 |
| Tobacco stem dust | 84.5 |

The first three components are first mixed and finely ground, then blended with the tobacco dust.

Selected plots in a rice field are dusted with the formulation described above employing a hand dust applicator. Application is at the rate of 15 kilograms of the formulation per hectare. The first application is made when the rice plants are about 10 inches tall and it is repeated at intervals of two weeks until about 14 days prior to harvest. The rice within the treated plots remains healthy and yields well. The untreated areas outside the test plots, however, are heavily infected with the rice blast fungus (*Piricularia oryzae*) and provide only a negligible yield of low quality grain. The compound of this invention applied by the method described controls rice blast disease.

EXAMPLE 24

| | Percent |
|---|---|
| Wettable powder of Example 18 | 14.3 |
| Expanded vermiculite (0.25–0.60 mm.) | 77.7 |
| Polyethylene glycol 400 di-triricinoleate | 8.0 |

The wettable powder and vermiculite are first blended briefly. The liquid surfactant is then sprayed upon the tumbling solids to prevent sergregation in storage and handling. The resulting granules contain 10% active fungicide.

The above granular formulation is applied to the covering soil in the planting of potato seed-pieces. The granules are dropped over a 10-centimeter band at the rate of 6,000 grams of commodity per 400 meters of row as the covering soil is pushed into place. This results in the applications of approximately 30 parts per million of active ingredient in the soil above the seed pieces. Rows treated in this manner produce healthy plants which yield well. Adjacent untreated rows, on the other hand, produce yellowish plants with fungus lesions on the stems near the surface of the soil that yield poorly. The damage in the untreated rows is caused by the soil borne fungus, Rhizoctonia. The compound of this invention applied in the compositions and manner described protects potato plants from attack by Rhizoctonia present in the soil.

EXAMPLE 25

| | Percent |
|---|---|
| 2-benzimidazolecarbamic acid, sec-butyl ester, 2:1 complex with zinc chloride | 15 |
| Kaolin clay | 82 |
| Methyl cellulose (15 c.p.s.) | 3 |

The components are blended, micropulverized and air milled. The resulting powder is moistened with 18–20% water and granulated. After drying the granules are screened to recover the fraction having a particle size range of 0.25 to 0.60 mm.

The granular formulation described above is applied to a pasture paddock in New Zealand at a rate to provide 2,000 grams of the active component per hectare. The application is made early in the moist portion of the growing period. Sheep grazing in the paddock remain healthy and grow well. Sheep in an adjacent untreated paddock are unhealthy and develop symptoms known as "face eczema" due to contact with and consumption of mycelia and spores of the fungus *Pithomyces chartorum* growing on the glass plants. The compound of this invention applied in the composition and by the method described controls *Pithomyces chartorum.*

I claim:

1. A complex having the formula:

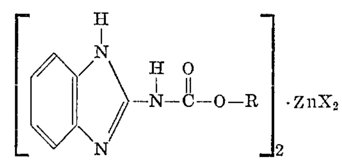

wherein:

R is methyl, ethyl, isopropyl, or sec-butyl; and
X is chlorine or bromine.

2. A complex having the formula:

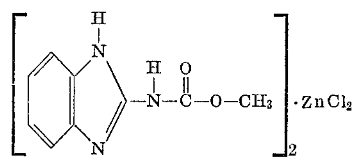

3. A complex having the formula:

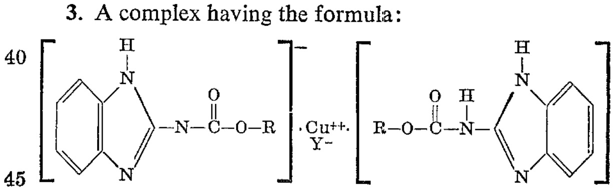

wherein:

R is methyl, ethyl, isopropyl or sec-butyl; and
Y is chlorine or bromine.

4. A complex having the formula:

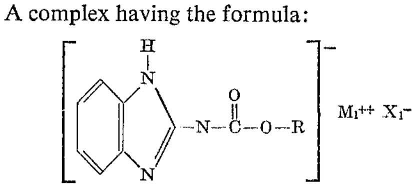

wherein:

R is methyl, ethyl, isopropyl, or sec-butyl;
$M_1$ is zinc or copper; and
$X_1$ is acetate or propionate when $M_1$ is zinc and is chlorine, bromine, acetate, or propionate when $M_1$ is copper.

No references cited.

ALEX MAZEL, Primary Examiner

R. J. GALLAGHER, Assistant Examiner

U.S. Cl. X.R.

424—425